(12) United States Patent
Goldstein et al.

(10) Patent No.: US 6,665,815 B1
(45) Date of Patent: Dec. 16, 2003

(54) PHYSICAL INCREMENTAL BACKUP USING SNAPSHOTS

(75) Inventors: Andrew C. Goldstein, Hudson, MA (US); David W. Thiel, Colorado Springs, CO (US); Richard F. Wrenn, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 578 days.

(21) Appl. No.: 09/599,707

(22) Filed: Jun. 22, 2000

(51) Int. Cl.[7] ............................................. G06F 11/00
(52) U.S. Cl. .................................................. 714/20
(58) Field of Search .............................. 714/15, 19, 20

(56) References Cited

U.S. PATENT DOCUMENTS

| | | | |
|---|---|---|---|
| 5,089,958 A | 2/1992 | Horton et al. | 395/575 |
| 5,263,154 A | 11/1993 | Eastridge et al. | |
| 5,559,991 A * | 9/1996 | Kanfi | 711/162 |
| 5,588,129 A * | 12/1996 | Ballard | 711/113 |
| 5,737,763 A | 4/1998 | Hilditch | 711/162 |
| 5,835,953 A * | 11/1998 | Ohran | 711/162 |
| 5,875,479 A | 2/1999 | Blount et al. | 711/162 |
| 6,185,577 B1 * | 2/2001 | Nainani et al. | 707/202 |
| 6,298,425 B1 | 10/2001 | Whitaker et al. | |
| 6,330,570 B1 | 12/2001 | Crighton | |
| 6,374,268 B1 | 4/2002 | Testardi | |
| 6,385,616 B1 * | 5/2002 | Gardner | 707/10 |
| 6,438,661 B1 * | 8/2002 | Beardsley et al. | 711/144 |
| 6,543,004 B1 | 4/2003 | Cagle et al. | |
| 6,552,672 B1 | 4/2003 | Ghildiyal et al. | |

* cited by examiner

*Primary Examiner*—Nadeem Iqbal
*Assistant Examiner*—Timothy M. Bonura

(57) ABSTRACT

A backup apparatus and method suitable for protecting the data volume in a computer system function by acquiring a base state snapshot and a sequential series of data volume snapshots, the apparatus concurrently generating succedent and precedent lists of snapshot differences which are used to create succedent and precedent backups respectively. The data volume is restored by overwriting the base state data with data blocks identified in one or more succedent backups. File recovery is accomplished by overwriting data from a current snapshot with one or more precedent backups.

19 Claims, 9 Drawing Sheets

PHYSICAL INCREMENTAL BACKUP USING SNAPSHOTS

BACKGROUND OF THE INVENTION

1. Field of the Invention

The present invention is related to the protection of computer data and, in particular, to a system and method for making backups made to offline storage media, such as tapes, that are not directly accessible as file-structured devices.

2. Description of the Prior Art

A backup procedure is a function that is typically included in most computer operating system software. One of the most pressing backup problems over the last several years has been the time vs. volume dilemma. Storage capacity and actual online storage volumes have increased at a geometric rate, roughly doubling every two years. However, the bandwidth of storage subsystems, that is, the rate at which data can be transferred into and out of the storage subsystem, has increased at a much slower rate. Consequently, the time required to make a complete copy of online storage has steadily increased. In addition, most backup procedures use the file system to produce file-coherent backups. This imposes additional overhead that considerably reduces the effective bandwidth of the storage subsystem. Many hours are required to make a full backup of a large scale installation.

At the same time, many computer installations are faced with increasingly stringent uptime requirements. The 'backup window' (i.e., the time during which the data is stable so that a coherent backup can be made) continues to shrink. In many cases, the available backup window is already smaller than the time required to create a full backup. Computer installations have applied a number of ad hoc measures to address these difficulties, with varying degrees of success. Consequently, many installations are running with inadequate or no backup coverage because the backup window is inadequate.

One approach is the physical backup, a brute force approach that copies the disk volume block for block, ignoring the file structure. The physical backup can operate at the maximum possible data rate of the storage subsystem. However, the physical backup does suffer from certain disadvantages. First, all activity on the disk volume must be completely frozen for the backup to be useful because there is no coordination with the file system. Second, recovery of individual files from a physical backup is cumbersome because the entire backup must be restored to disk to process the file structure. Third, even the maximum storage bandwidth may be inadequate in a very large-scale storage environment to perform a full physical backup in the available backup window.

Another well-known approach is the incremental file backup. In this approach, individual files are backed up if they have been modified since the previous backup. If they have not changed, they are not backed up. This method reduces the volume of data to be backed up to the volume of files that have changed. It works well in an environment where files are relatively small and are typically modified in their entirety. It does not work well when files are large, and typical updates modify a small part of the file, because even with a small modification the entire file must be backed up. Also, complete reconstruction of a data volume from incremental file backups can be problematical because files that are deleted during the life of the volume will reappear when successive incremental backups are restored. Depending on the design of the file system and the backup, incremental restores can introduce other inaccuracies, compared to the original volume.

However, the basic incremental backup method suffers from the disadvantages that a considerable amount of time is spent processing the file structure to locate files that need to be backed up, and the process of reconstructing a disk volume from incremental backups is complex and trouble-prone. Accordingly, the system manager would typically perform periodic full backups in addition to the incremental backups to limit the risk of recovering with incremental backups alone.

Another approach is disclosed in U.S. Pat. No. 5,835,953, "Backup system that takes a snapshot of the locations in a mass storage device that has been identified for updating prior to updating," issued to Ohran. This basic incremental backup method includes maintaining a "virtual disk" subsystem capable of generating snapshots and making a full copy of the snapshot for remote disk storage. An initial and a subsequent snapshots are obtained. Snapshot mapping data is used to determine the data blocks which have changed from the initial snapshot to the subsequent snapshot. The changed blocks are then copied to the remote storage, the initial snapshot is deleted, and the process is continued as needed.

The method disclosed in Ohran '953, for example, provides a complete backup copy of the data volume to allow recovery if the original volume is lost. However, the prior art does not address situations in which individual files need to be recovered, such as when a file is erroneously deleted or when an application fails and writes incorrect data. Once a snapshot and copy cycle have been performed using a conventional method, the previous (and possible the only valid) file contents are lost. Thus, there is a need in the art for an effective backup strategy which preserves old versions of the file contents at suitable intervals to allow recovery when errors are subsequently detected.

SUMMARY OF THE INVENTION

The data volume in a computer system can be protected by first acquiring a base state snapshot and a subsequent series of data volume snapshots. A plurality of snapshot difference lists can be generated by identifying those data blocks which differ between sequential snapshots. A precedent snapshot difference list, generated by identifying the data blocks in any snapshot differing from the data blocks in a subsequent snapshot, is used to recover files without incurring a full restore. The data blocks described by the snapshot difference list are copied to backup storage and the snapshot is deleted. File recovery is accomplished by overwriting data from a current snapshot list with one or more precedent backups. A succedent snapshot difference list, generated by identifying the data blocks in any snapshot differing from the data blocks in a previous snapshot, is used to restore a data volume. The data volume is restored by restoring the base state data with data blocks contained in one or more succedent backups.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
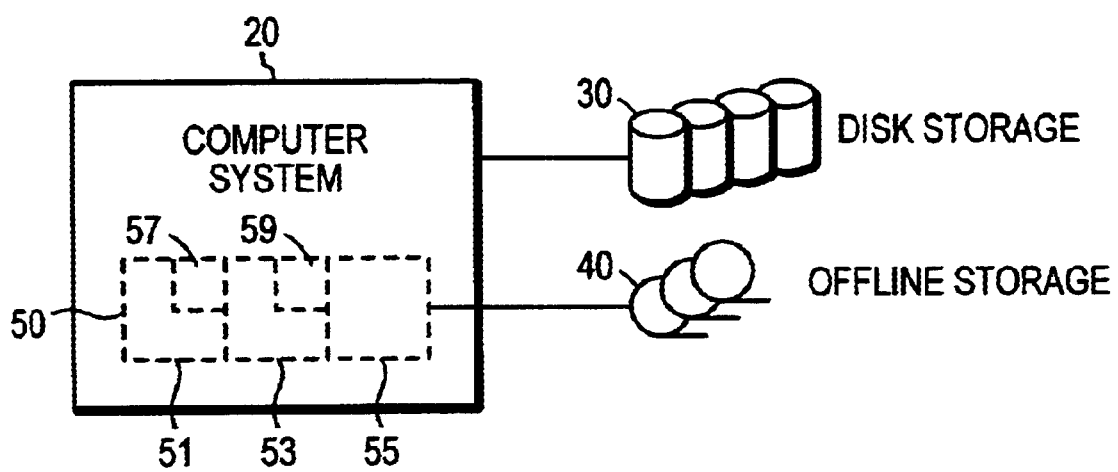
FIG. 1 is a diagrammatical illustration of an apparatus for protecting the data volume in a computer system, in accordance with the present invention.

FIG. 1 is a diagrammatical illustration of an apparatus for protecting the data volume in a computer system 20, in accordance with the present invention. The computer system 20 accesses and stores the data volume in a disk storage 30. The computer system 20 includes backup processing means 50 for creating backups of portions of the disk storage 30. Backup processing means 50 includes a snapshot section 51 for acquiring snapshots 57 of the consistent states of the data volume in disk storage 30, as explained in greater detail below. The snapshots 57 are compared by a processing unit 53, as explained in greater detail below, to produce a list of blocks that have changed between the snapshots 57 so that those blocks may be copied into backups 59. In a preferred embodiment, backup processing means 50 also includes a sending unit 55 for storing the backups 59 in the offline storage 40.

Figure 2:
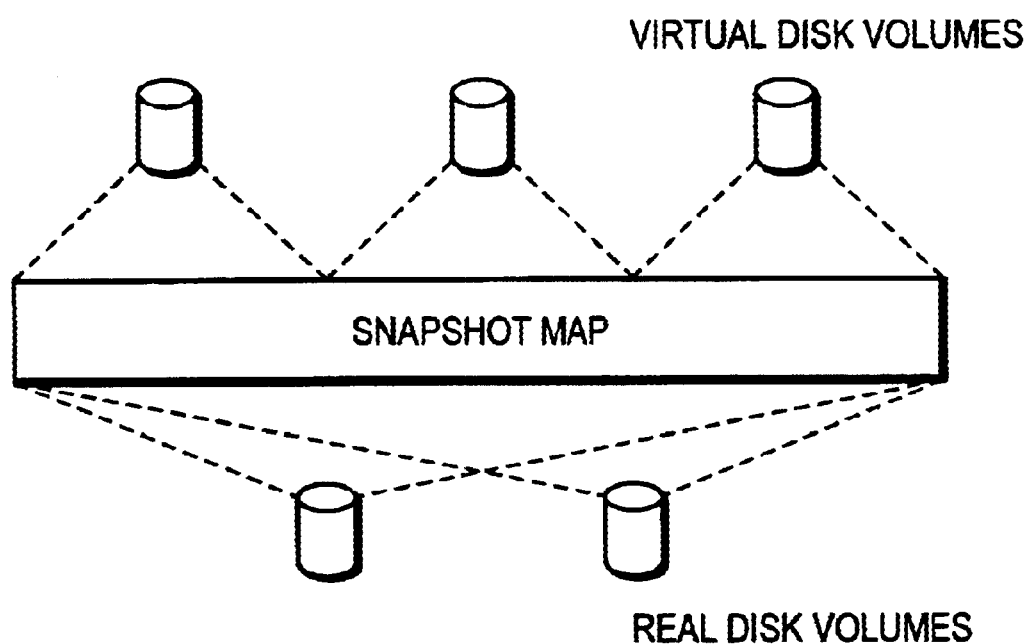
FIG. 2 is a diagrammatical illustration of the relationship between real disk volumes and virtual disk volumes.

Referring to FIG. 2, a snapshot is a virtual copy of a disk volume. The snapshot appears to be another disk volume, but actually mostly shares the physical data storage of the original volume. Snapshots solve the backup window problem. Once the snapshot has been taken, system operation can continue while the backup is taken of the snapshot. Effectively, the backup window is extended to the interval between successive backups. The process of creating a virtual volume and taking snapshots is known in the relevant art. See, for example, the method taught by Ohran '953 which functions to retain two snapshots at a time. In the present method, multiple snapshots may be retained, as discussed in greater detail below.

Succedent Physical Incremental Backup

Figure 3:
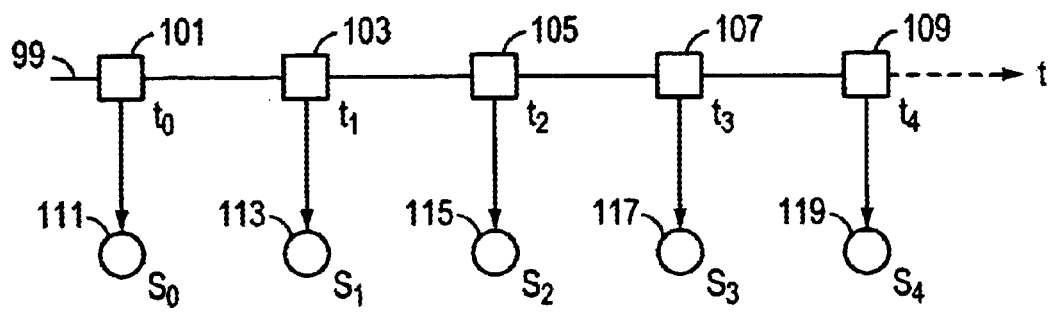
FIG. 3 is a timeline showing a series of snapshots being acquired of a sequence of data volume consistent states.

Operation of the processing means 50 can best be explained first with reference to FIG. 3, in which the data volume is represented as a sequence of data volume consistent states occurring along a timeline 99. A data volume base state 101 is defined as the state of the data volume at a baseline time $t_0$. A base state snapshot 111 ($S_0$) is made of the data volume base state 101. A first data volume consistent state 103 occurs at a time $t_1 > t_0$, when the data volume is in a subsequent consistent state. The determination of a consistent state can be made, for example, by a network administrator or by an expert system.

A first state snapshot 113 ($S_1$) is made of the first data volume consistent state 103. Similarly, a second data volume consistent state 105 occurs at a time $t_2 > t_1$, a third data volume consistent state 107 occurs at a time $t_3 > t_2$, and a fourth data volume consistent state 109 occurs at a time $t_4 > t_3$ where it is determined that the data volume is in a respective consistent state at times $t_2$, $t_3$, and $t_4$, and so on. A second state snapshot 115 ($S_2$), a third state snapshot 117 ($S_3$), and a fourth state snapshot 119 ($S_4$), corresponding to data volume states 105, 107, and 109 respectively, are generated.

Figure 4:
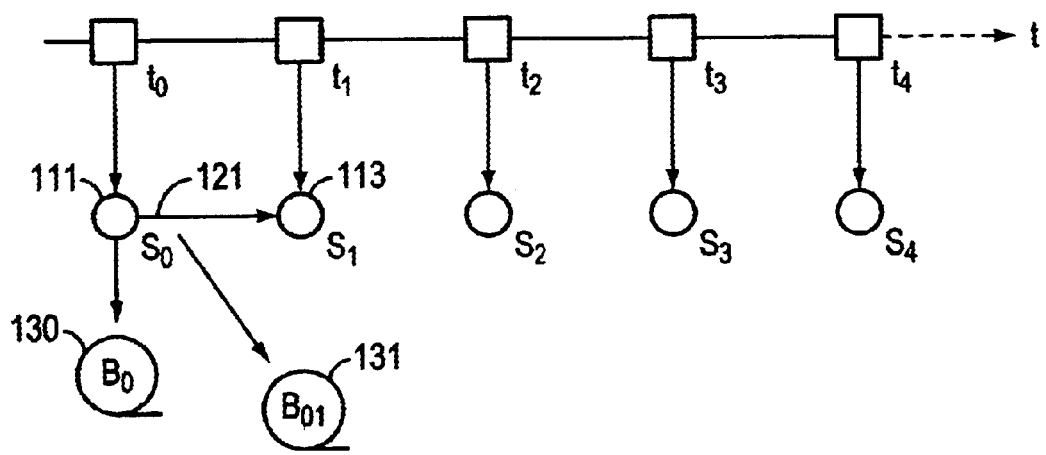
FIGS. 4–6 show the generation of a base state backup and first through third succedent backups on the timeline of FIG. 3.

In FIG. 4, a full base state backup 130 ($B_0$) is made of the base state snapshot 111 by copying the entire contents of the base state snapshot 111. A first succedent snapshot difference list 121 ($S_{01}$) in data volume state snapshots is then obtained. A 'snapshot difference list' (e.g., $S_0 \rightarrow S_1$) is a list of identifiers of those data blocks in the first state snapshot 113 ($S_1$) that differ from the data blocks in the base state snapshot 111 ($S_0$). A 'data block' is a subset of the data volume, typically about 65K bytes, and is determined according to a user's requirements. As can be appreciated by one skilled in the art, a larger data block size will result in the need to copy larger units of data to snapshot storage. On the other hand, while a smaller data block size will allow for smaller data units to be copied to snapshot storage, this is achieved at the cost of allocating a larger snapshot map to identify the larger number of the smaller data blocks.

This difference list is then used to list the data blocks that are copied from the snapshot itself to the backup. The first succedent snapshot difference list 121 is generated by identifying those data blocks of the first state snapshot 113 that differ from the data blocks of the base state snapshot 111. These segments can be identified by examining the snapshot mapping data. The first succedent snapshot difference list 121 thus includes identifiers of all the data blocks of the first state snapshot 113 differing from data blocks in the base snapshot 111. A first succedent backup 131 ($B_{01}$) is created by copying from the first state snapshot 113 ($S_1$) all the data blocks identified in the first succedent snapshot difference list 121. A copy of the snapshot difference list 121 is also included in the first succedent backup 131.

Figure 5:
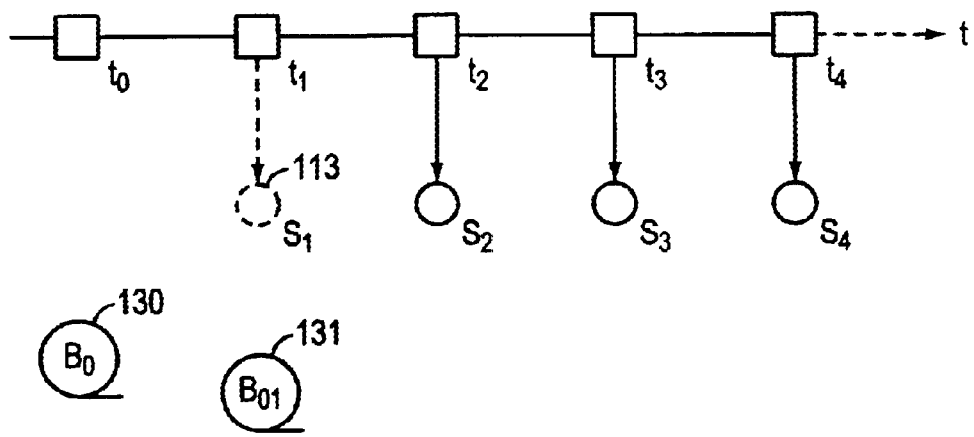

Once the first succedent backup 131 has been created, the first state snapshot 113 may be partially deleted, as indicated by dashed lines in FIG. 5, and the base state snapshot 111 may be fully deleted. By 'partial deletion' is meant that the mapping metadata for first state snapshot 113 is not deleted. With the deletion of the base state snapshot 111 and the partial deletion of the first state snapshot 113, it is possible to release blocks in the storage pool containing data unique to the base state snapshot 111 and the first state snapshot 113. In general, snapshots may be retained online for fast file recovery and/or deleted at a later time.

Figure 6:
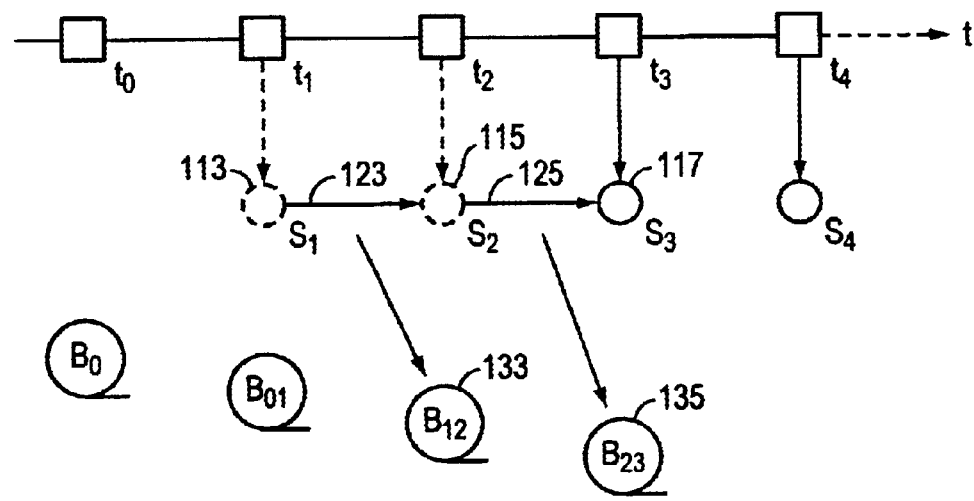

As best seen in FIG. 6, a second succedent snapshot difference list 123 ($S_{12}$) in state snapshots (i.e., $S_1 \rightarrow S_2$) is generated. A second succedent backup 133 ($B_{12}$) is created from the second succedent snapshot difference list 123 by examining the snap disk metadata and copying from the second state snapshot 115 all the data blocks listed in the second succedent snapshot difference list 123 and copying the second succedent snapshot difference list 123 itself. Once the second succedent backup 133 has been made, the second state snapshot 115 may be partially deleted, leaving at least the mapping metadata for the second state snapshot 115 ($S_2$), and the first state snapshot 113 may be fully deleted.

This process is continued: the third state snapshot 117 ($S_3$) is made of a subsequent consistent state of the data volume; a third succedent snapshot difference list 125 ($S_{23}$) in state snapshots (i.e., $S_2 \rightarrow S_3$) is generated; and a third succedent backup 135 ($B_{23}$) is made by copying from the third state snapshot 117 all the data blocks listed in the third succedent snapshot difference list 125 and copying the third succedent snapshot difference list 125 itself.

Offline Consolidation

The full base state backup 130, the first succedent backup 131, and the second succedent backup 133 are preferably stored offline in conventional memory, such as magnetic and optical media. The full base state backup 130 ($B_0$) may be consolidated with the first succedent backup 131 ($B_{01}$) to yield a new base state backup (i.e., $B_1$). That is, the operation is equivalent to making a full base state backup of the first state snapshot 113 ($S_1$). This is done by selectively copying the contents of the full base state backup 130 ($B_0$) and copying the contents of the first succedent backup 131 ($B_{01}$) such that the new base state backup ($B_1$) includes: i) the entire contents of the first succedent backup 131 ($B_{01}$), and ii) those blocks in the full base state backup 130 ($B_0$) which are not present in the first succedent backup 131 ($B_{01}$). This operation may be performed in an offline manner, that is, without making reference to the online data.

In comparison to the consolidation of conventional file-structured backups, consolidation of logical volumes as disclosed herein is more direct. A logical volume is a set of data blocks, where each data block may be read and written only. Thus, consolidating physical incremental save sets is relatively simple with the results being assured. If desired, a verification function can be included to verify the correctness of saved backups. For example, a consolidated backup can be created by consolidating the full base state backup 130 ($B_0$), the first succedent backup 131 ($B_{01}$), and the second succedent backup 133 (i.e., $B_{12}$). It can then be verified that the resulting consolidated backup is equivalent to a full second state backup $B_2$ (not shown) by comparing its contents with the contents of the second state snapshot 115 while the second state snapshot 115 is still online.

One advantage of offline consolidation is that the consolidation process requires no bandwidth in the primary data store at the expense of requiring additional equipment in the form of tape drives and processing power. An important characteristic of the physical incremental backup is that only those data blocks that have changed are copied and not entire files. With a file-based incremental backup, changing just one record in a file causes the entire file to be backed up. With a physical incremental, only the data blocks containing the updated record, and possibly affected index blocks, are backed up.

Incremental Data Volume Restore

To recover the data volume in the present example, the backups are restored in successive order. The full base state backup 130 ($B_0$) is obtained and subsequently overwritten with the first succedent backup 131 and then with the second succedent backup 133. This yields an exact copy of the volume as of its second state snapshot 115. Alternately, if the full base state backup 130 ($B_0$) and the subsequent incrementals $B_{01}$ and $B_{12}$ had been previously consolidated into a single backup, a simple restoring procedure would also restore the volume to its state at second state snapshot 115 ($S_2$).

The process of succedent incremental backups works well for disaster recovery (i.e., situations in which the entire volume has been lost), but is not practical for the recovery of individual files. Ideally, the individual file is recovered by copying it from a snapshot that is still online. However, if snapshots have been rolled out and deleted, restoring a snapshot requires, in effect, recovering the entire volume by restoring the base state snapshot 111 and all subsequent snapshots up to the one containing the desired file. The succedent incremental backup process for recovery of a file is thus equivalent to a full physical restore of the data volume.

Precedent Physical Incremental Backup

Figure 7:
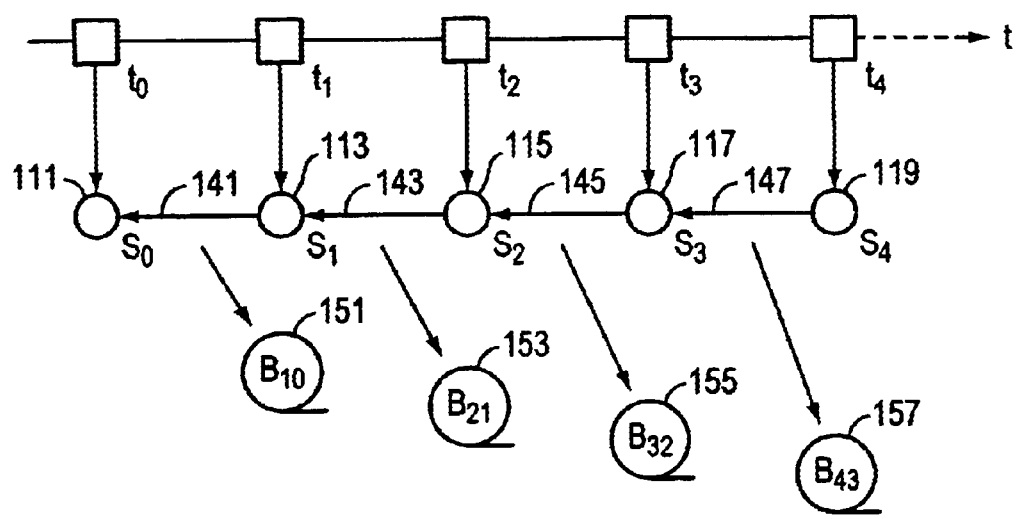
FIG. 7 shows the generation of first through fourth precedent backups on the timeline of FIG. 3.

File recovery is best accomplished when a precedent physical incremental backup has been performed. This process is illustrated in FIG. 7, where a base state snapshot difference list 141 ($S_{10}$) in state snapshots (i.e., $S_1 \rightarrow S_0$) is generated by identifying all segments of the base state snapshot 111 that are different from the first state snapshot 113. A base state backup 151 ($B_{10}$) is made by copying from the first state snapshot 113 all the data blocks identified in the base state snapshot difference list 141. Once the copying step has been performed, the base state snapshot 111 can be deleted.

A first precedent snapshot difference list 143 ($S_{21}$) in state snapshots (i.e., $S_2 \rightarrow S_1$) is generated. All segments of the first state snapshot 113 that are different from the second state snapshot 115 are listed. A first precedent backup 153 ($B_{21}$) is made by copying from the first state snapshot 113 all the data blocks identified in the first precedent snapshot difference list 143 and by copying the first precedent snapshot difference list 143. Once the copying steps have been performed, the first state snapshot 113 can be deleted (not shown). The precedent physical incremental backup process is continued to obtain a second precedent snapshot difference list 145 ($S_{32}$) and a second precedent backup 155 ($B_{32}$), and a third precedent snapshot difference list 147 ($S_{43}$) and a third precedent backup 157 ($B_{43}$) in a similar manner.

Incremental File Restore

Figure 8:
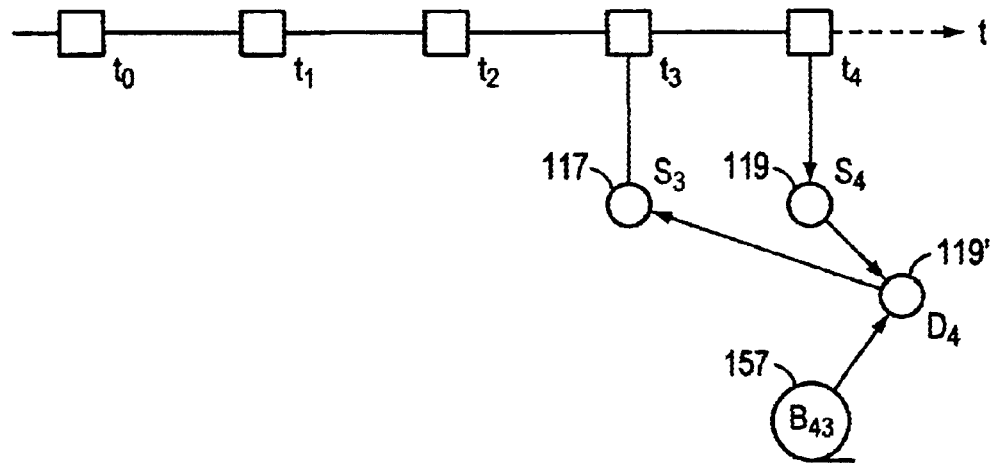
FIGS. 8–9 illustrate the restoration of a file by using the precedent backups generated in FIG. 7.

Restoration of a file resident in an antecedent snapshot can be effectively accomplished by rolling back from a snapshot that is still online. For example, the fourth state snapshot 119, as shown in FIG. 8, is still online at the time $t_4$. The restoration of the first state snapshot 113 can then be accomplished by means of the following procedure.

A duplicate fourth state snapshot 119' ($D_4$) is cloned from the fourth state snapshot 119 and overwritten with the contents of the third precedent backup 157. This to produces a copy of the third state snapshot 117. The incremental storage and time required to restore are directly proportional to the amount of change between the two respective snapshots.

Figure 9:
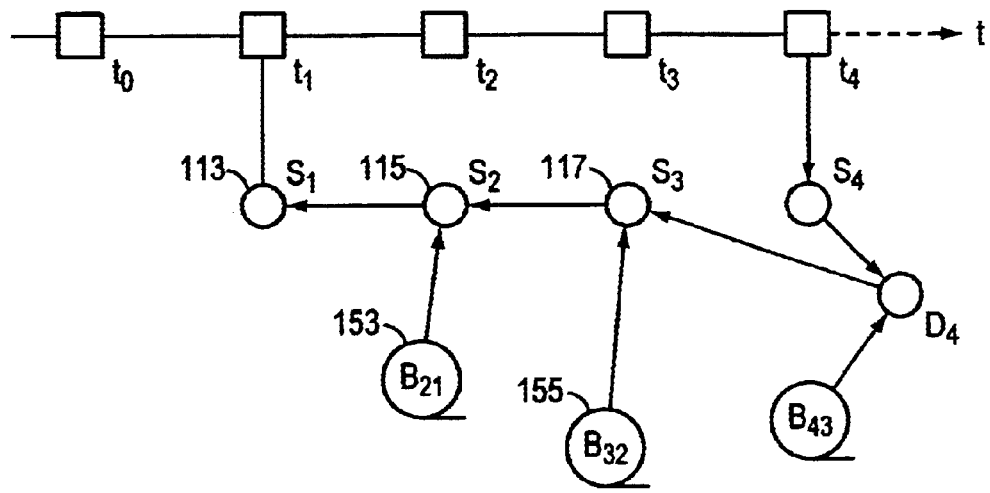

The third state snapshot 117 is then overwritten with the contents of the second precedent backup 155 to give the second state snapshot 115, as shown in FIG. 9. After the second state snapshot 115 is overwritten with the first precedent backup 153, the first state snapshot 113 is obtained. More generally, any snapshot can be restored using a series of precedent or succedent incrementals by duplicating or cloning the oldest (or nearest) available online snapshot and then restoring the necessary chain of backups. For example, if the base state snapshot 111 were still online, one could recover the first state snapshot 113 by cloning the base state snapshot 111 to produce a duplicate base state snapshot 111' and then overwriting the duplicate base state snapshot 111' with the contents of the first succedent backup 131.

In an alternative embodiment, a 'conditional overwrite,' rather than a complete overwrite, is performed in the file recovery process. As can be appreciated by one skilled in the relevant art, each complete overwrite results in a copy-out which consumes real storage space. In a conditional overwrite, the existing data blocks listed in the third state snapshot 117, for example, are compared with the 'new' data blocks listed in the second precedent backup 155. If a new data block is the same as the respective data block listed in the third state snapshot 117, then the respective data block listed in the third state snapshot 117 is not written over. If the new data block is not the same as the respective data block listed in the third state snapshot 117, then the respective data block listed in the third state snapshot 117 is written over. This technique is especially important when restoring composite backups, as described in greater detail below.

Offline Consolidation of Precedent Backups

Figure 10:
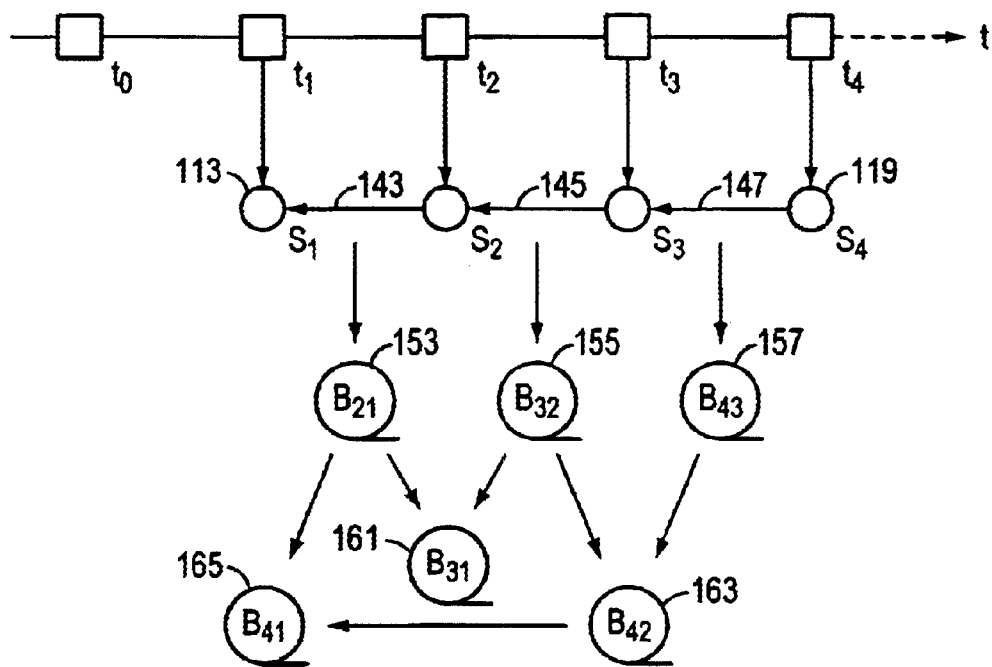
FIG. 10 shows the process of concatenating two or more of the precedent backups of FIG. 7 to form one or more concatenated precedent backups.

Successive precedent backups may be combined into a single precedent backup to reduce offline storage volume and to speed incremental file recovery, as shown in FIG. 10. In way of example, the second precedent backup 155 and the first precedent backup 153 can be combined into a concatenated precedent backup 161 ($B_{31}$) by copying the contents of the first precedent backup 153 in its entirety, and including only the contents of the second precedent backup 155 where corresponding blocks are not present in the first precedent backup 153. The first precedent snapshot difference list 153 and the second precedent snapshot difference list 155 are also copied into the concatenated precedent backup 161.

Figure 11:
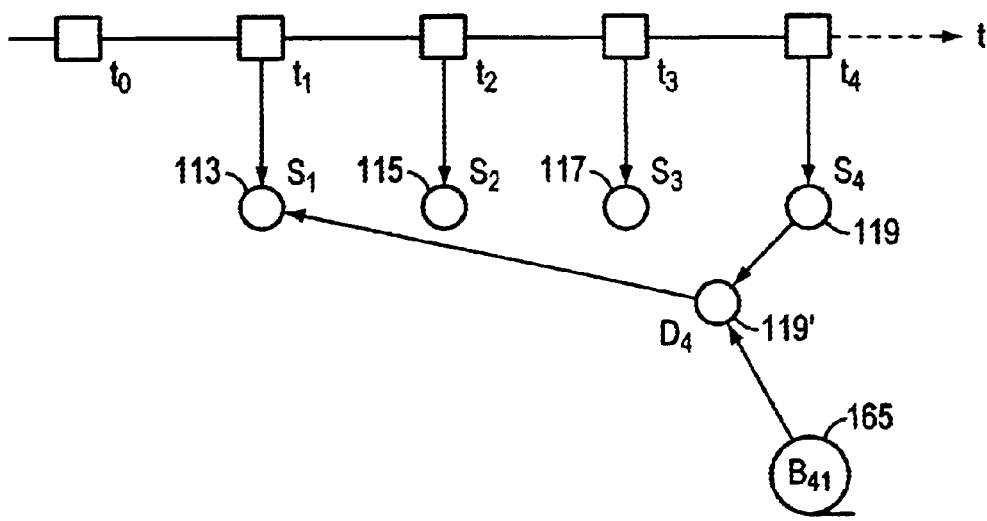
FIG. 11 illustrates the restoration of a file using one of the concatenated backups of FIG. 10.

By way of further example, the third precedent backup 157 and the second precedent backup 155 are combined into a concatenated precedent backup 163 ($B_{42}$) by copying the contents of the second precedent backup 155 in its entirety, and including only the contents of the third precedent backup 157 where corresponding blocks are not present in the second precedent backup 155. The concatenated precedent backup 163 is thus a concatenation of the third precedent backup 157 and the second precedent backup 155, and should not be considered as simply a precedent backup. In a subsequent operation, the concatenated precedent backup 163 may be combined with the first precedent backup 153 into a concatenated precedent backup 165 ($B_{41}$) in a similar manner, that is by copying the contents of the first precedent backup 153 in its entirety, and including only the contents of the concatenated precedent backup 163 where corresponding blocks are not present in the first precedent backup 153. The concatenated precedent backup 165 also includes the all three precedent snapshot difference lists 143, 145, and 147. Thus, the first state snapshot 113 can be directly obtained from the online fourth state snapshot 119 by overwriting the duplicate fourth state snapshot 119' with the concatenated precedent backup 165, as shown in FIG. 11. A similar procedure can be used to obtain the first state snapshot 113 from the online third state snapshot 117 by overwriting a duplicate third state snapshot 117' with the concatenated precedent backup 161 (not shown).

Moreover, as is apparent to one skilled in the relevant art, the concatenated precedent backup 165 can also be used to restore the first state snapshot 113 from a duplicate of the second state snapshot 115 or a duplicate of the third state snapshot 117, if available. In such a restoration operation, the conditional overwrite process described above is particularly important as the concatenated precedent backup 165 contains blocks whose contents match the contents of the corresponding blocks in the second state snapshot 115 or the third state snapshot 117, and are therefore redundant for the restoration process.

In yet another embodiment, unnecessary copy-outs can be avoided by using the list of differences contained in the respective precedent backup. The first precedent backup 153 contains a first differences list, which can be denoted by $L_{21}$. Similarly, the second precedent backup 155 contains a second differences list denoted by $L_{32}$, and the third precedent backup 157 contains a third differences list denoted by $L_{43}$. When a series of precedent backups are concatenated, there are included copies of all the differences lists of the individual backups incorporated into the respective concatenated backup. For example, the concatenated precedent backup 165, which is created by combining the third precedent backup 157, the second precedent backup 155, and the first precedent backup 153, includes the first differences list $L_{21}$, the second differences list $L_{32}$, and the third differences list $L_{43}$. Thus, if the concatenated precedent backup 165 is used to restore the first state snapshot 113 by using a duplicate second subsequent snapshot $D_2$ (not shown), only the first differences list $L_{21}$ is needed to select blocks from the concatenated precedent backup 165 for restoration. However, if the concatenated precedent backup 165 is used to restore the first state snapshot 113 by using the duplicate fourth state snapshot 119', all three differences lists $L_{21}$, $L_{32}$, and $L_{43}$ are needed to select blocks from the concatenated precedent backup 165 for restoration.

Offline Consolidation of Succedent Backups

Figure 12:
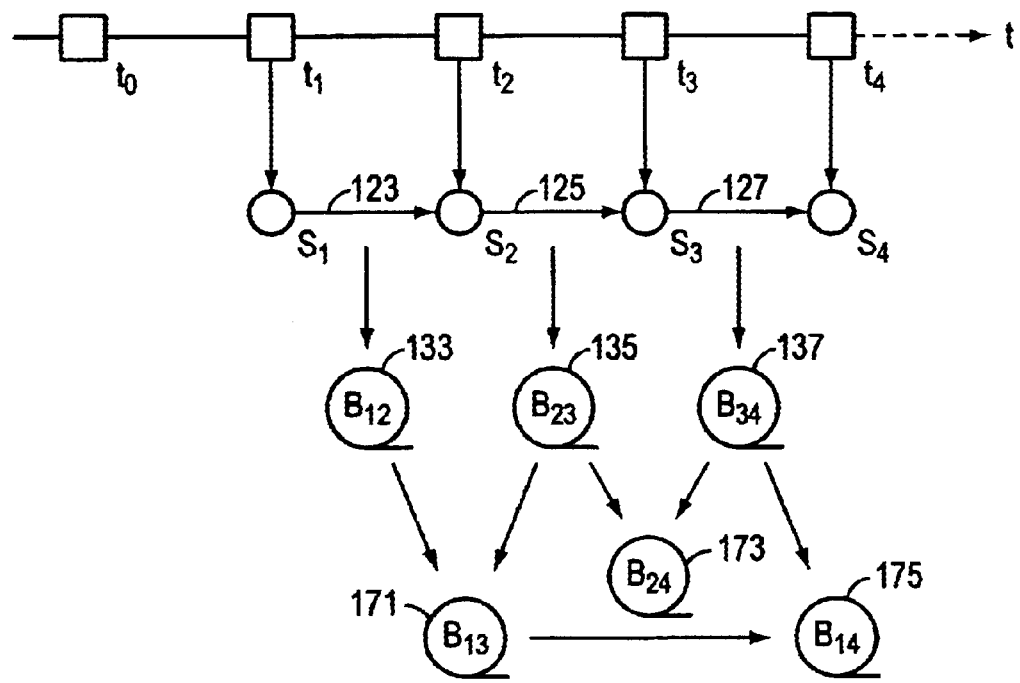
FIG. 12 shows the process of concatenating two or more of the succedent backups of FIG. 6 to form one or more concatenated succedent backups.

In a method similar to the concatenation of precedent backups, described above, successive succedent backups may be combined into a single succedent backup to reduce offline storage volume and to speed disaster recovery, as shown in FIG. 12. The second succedent backup 135, for example, and a third succedent backup 137 ($B_{34}$), obtained from a fourth succedent snapshot difference list 127, can be combined into a concatenated succedent backup 173 ($B_{24}$) by copying the contents of the third succedent backup 137 in its entirety, and including only the contents of the second succedent backup 135 where corresponding blocks are not present in the third succedent backup 137. The second succedent snapshot difference list 125 and the third succedent snapshot difference list 127 are also copied into the concatenated succedent backup 173.

As explained above, the invention is not limited to the process of concatenating only successive backups but also includes the concatenation of multiple succedent backups. The first succedent backup 133, for example, and the second succedent backup 135 can be combined into a concatenated succedent backup 171 ($B_{13}$) by copying the contents of the second succedent backup 135 in its entirety, and including only the contents of the first succedent backup 133 where corresponding blocks are not present in the second succedent backup 135. The first succedent snapshot difference list 123 and the second succedent snapshot difference list 125 are also copied into the concatenated succedent backup 171.

Figure 13:
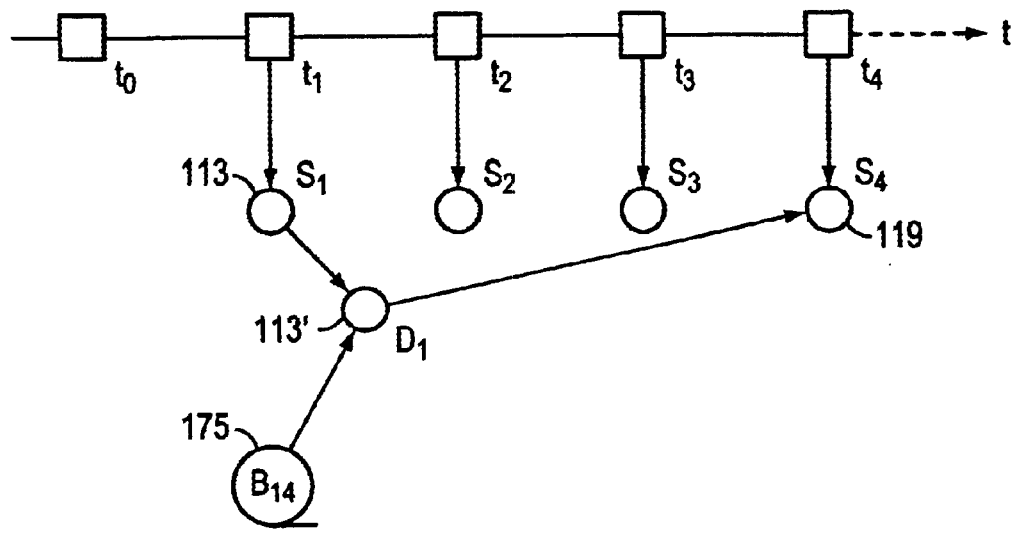
FIG. 13 illustrates a method of disaster recovery using one of the concatenated backups of FIG. 12; and, FIGS. 14–15 illustrate the generation of composite backups.

The third succedent backup 137 can then be combined with the concatenated succedent backup 171 into a concatenated succedent backup 175 ($B_{14}$) by copying the contents of the third succedent backup 137 in its entirety, and including only the contents of the concatenated succedent backup 171 where corresponding blocks are not present in the third succedent backup 137. The concatenated succedent backup 175 also includes all three succedent snapshot difference lists 123, 125, and 127. The concatenated succedent backup 175 is thus a concatenation of the third succedent backup 137 and the concatenated succedent backup 171, and should not be considered as simply a succedent backup. The fourth state snapshot 119, therefore, can be directly obtained from the first state snapshot 113 by overwriting a duplicate first state snapshot 113' with the concatenated succedent backup 175, as shown in FIG. 13.

Composite Physical Incremental Backup

Figure 14:
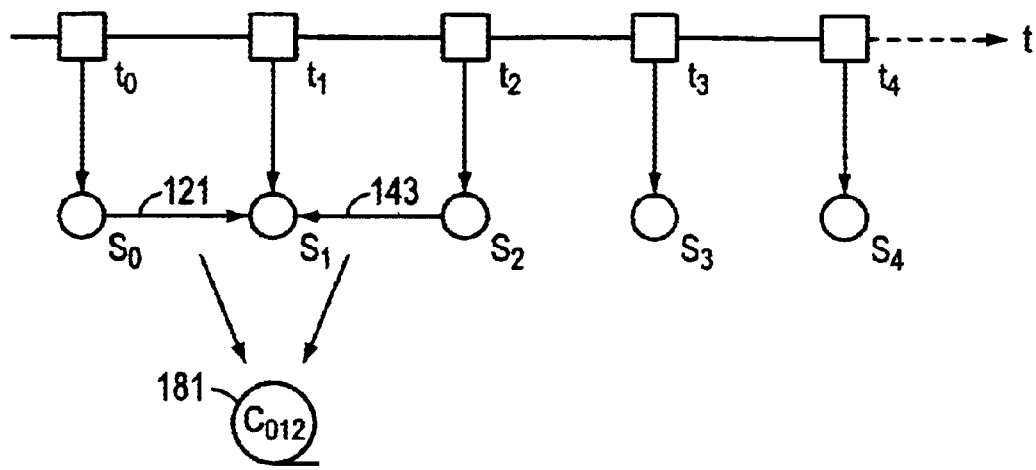
Figure 15:
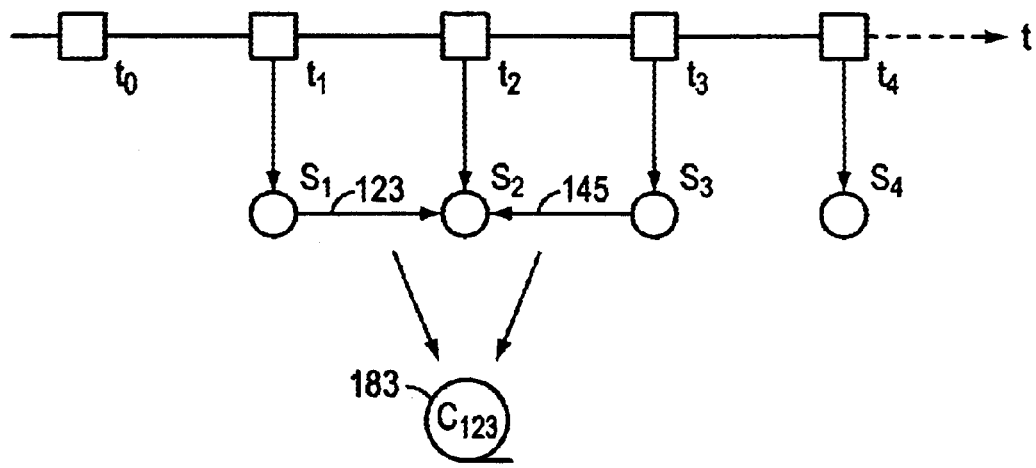

In a preferred embodiment, succedent physical incremental backup and precedent physical incremental backup are combined into a series of composite incremental backups, as shown in FIGS. 14 and 15. A first composite backup 181 ($C_{012}$) includes both the first succedent snapshot difference list 121 and the first precedent snapshot difference list 143. A second composite backup 183 ($C_{123}$) includes both the second succedent snapshot difference list 123 and the second precedent snapshot difference list 145. The first composite backup 181 and the second composite backup 183 are stored offline.

In general, the composite physical incremental backup procedure begins by first acquiring the base state snapshot 111 ($S_0$) of a data volume base state at a time $t_0$. A successive series of n snapshots, $S_1$ through $S_n$ are then acquired at data volume consistent states occurring at times $t_1<t_2< \ldots <t_n$ respectively. As the snapshots are acquired, three sets of derived products are generated or created. For the first derived set, a $j^{th}$ succedent snapshot difference list $S_{(j-1)(j)}$ is generated as each corresponding snapshot $S_j$ is acquired, where $1<j<n$. In all, a series of n succedent snapshot difference lists $S_{01}$ through $S_{(n-1)(n)}$ is obtained from the succession of n snapshots $S_1$ through $S_n$. For the second derived set, a $(j-1)^{th}$ precedent snapshot difference list $S_{(j)(j-1)}$ is generated as each corresponding snapshot $S_j$ is acquired. In all, a series of n precedent snapshot difference lists $S_{10}$ through $S_{(n)(n-1)}$ is obtained from the succession of n snapshots $S_1$ through $S_n$.

An initial base state backup 130 ($B_0$) is made by copying the contents of the initial base state snapshot ($S_0$) in its entirety. The initial precedent incremental base state backup 151 ($B_{10}$) is made by copying from the base state snapshot 111 ($S_0$) all the blocks in the base state snapshot difference list 141 ($S_{10}$). For the third derived set, a $(j-1)^{th}$ composite backup $C_{(j-2)(j-1)(j)}$ is created by copying from the $(j-1)^{th}$ state snapshot all the data blocks identified in the corresponding $(j-1)^{th}$ succedent snapshot difference list $S_{(j-2)(j-1)}$, and by copying from the $(j-1)^{th}$ state snapshot all the data blocks identified in the $(j-1)^{th}$ precedent snapshot difference list $S_{(j)(j-1)}$ to produce a series of (n–1) composite backups $C_{012}$ through $C_{(n-2)(n-1)(n)}$. Preferably, each snapshot $S_1$ through $S_{(n-1)}$ is tagged with a unique identifier and each composite backup $C_{012}$ through $C_{(n-2)(n-1)(n)}$ is tagged with the unique identifiers corresponding to the snapshots from which it is derived. Each composite backup $C_{(j-2)(j-1)(j)}$ is thus tagged with the unique identifiers of snapshots $S_{(j-2)}$, $S_{(j-1)}$, and $S_{(j)}$, where snapshots $S_{(j-2)}$ and $S_{(j)}$ are referred to as difference snapshots, and $S_{(j-1)}$ is referred to as the contents snapshot. The unique identifiers may be used in a data recovery procedure.

In the composite physical incremental backup process, disaster recovery is accomplished by restoring the base state backup 130 ($B_0$) and overwriting it with the succedent incrementals (i.e., $B_{01}$, $C_{012}$, $C_{123}$, . . . ), as described for the succedent physical incremental backup procedure above. File recovery is accomplished by rolling back from an online snapshot (e.g., $S_j$) by successively overwriting a duplicate ($D_j$) of the online snapshot with the composite incrementals ($C_{(j-2)(j-1)(j)}$, $C_{(j-3)(j-2)(j-1)}$, $C_{(j-4)(j-3)(j-2)}$, . . . ), in a similar manner as described above for the precedent physical incremental backup procedure. At each overwrite step, the current unique identifier of the snapshot being overwritten is compared to the unique identifiers of the difference snapshots in the composite backup. After the overwrite has been completed, the unique identifier of the updated snapshot is set to be the unique identifier of the contents snapshot of the composite backup. This ensures that the correct incremental is being used.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A method of protecting computer data, said method comprising the steps of:

acquiring a first state snapshot $S_1$ of a first data volume consistent state at a time $t_1$;

acquiring a second state snapshot $S_2$ of a second data volume consistent state at a time $t_2>t_1$;

generating a first precedent snapshot difference list $S_{21}$ comprising an identification of data blocks of said first state snapshot $S_1$ differing from data blocks in said second state snapshot $S_2$;

creating a first precedent backup $B_{21}$ by copying from said first state snapshot $S_1$ data blocks identified in said first precedent snapshot difference list $S_{21}$, said first precedent backup $B_{21}$ further comprising said first precedent snapshot difference list $S_{21}$;

deleting said first state snapshot $S_1$ following said step of generating a first precedent snapshot difference list $S_{21}$;

retrieving said first precedent backup $B_{21}$;

recovering said first precedent snapshot difference list $S_{21}$ from said first precedent backup $B_{21}$; and restoring said first state snapshot $S_1$ by overwriting at least a portion of said second state snapshot $S_2$ with the contents of said first precedent backup $B_{21}$.

2. A method of protecting computer data, said method comprising the steps of:

acquiring a first state snapshot $S_1$ of a first data volume consistent state at a time $t_1$;

acquiring a second state snapshot $S_2$ of a second data volume consistent state at a time $t_2>t_1$;

generating a first precedent snapshot difference list $S_{21}$ comprising an identification of data blocks of said first state snapshot $S_1$ differing from data blocks in said second state snapshot $S_2$;

creating a first precedent backup $B_{21}$ by copying from said first state snapshot $S_1$ data blocks identified in said first precedent snapshot difference list $S_{21}$, said first precedent backup $B_{21}$ further comprising said first precedent snapshot difference list $S_{21}$;

acquiring a third state snapshot $S_3$ of a third data volume consistent state at a time $t_3>t_2$;

generating a second precedent snapshot difference list $S_{32}$ comprising an identification of data blocks of said second state snapshot $S_2$ differing from data blocks in said third state snapshot $S_3$;

creating a second precedent backup $B_{32}$ by copying from said second state snapshot $S_2$ data blocks identified in said second precedent snapshot difference list $S_{32}$, said second precedent backup $B_{32}$ further comprising said second precedent snapshot difference list $S_{32}$; and deleting said second state snapshot $S_2$ following said step of generating a second precedent snapshot difference list $S_{32}$.

3. A method of protecting computer data, said method comprising the steps of:

acquiring a first state snapshot $S_1$ of a first data volume consistent state at a time $t_1$;

acquiring a second state snapshot $S_2$ of a second data volume consistent state at a time $t_2>t_1$;

generating a first precedent snapshot difference list $S_{21}$ comprising an identification of data blocks of said first state snapshot $S_1$ differing from data blocks in said second state snapshot $S_2$;

creating a first precedent backup $B_{21}$ by copying from said first state snapshot $S_1$ data blocks identified in said first precedent snapshot difference list $S_{21}$, said first precedent backup $B_{21}$ further comprising said first precedent snapshot difference list $S_{21}$;

acquiring a third state snapshot $S_3$ of a third data volume consistent state at a time $t_3>t_2$;

generating a second precedent snapshot difference list $S_{32}$ comprising an identification of data blocks of said second state snapshot $S_2$ differing from data blocks in said third state snapshot $S_3$;

creating a second precedent backup $B_{32}$ by copying from said second state snapshot $S_2$ data blocks identified in said second precedent snapshot difference list $S_{32}$, said second precedent backup $B_{32}$ further comprising said second precedent snapshot difference list $S_{32}$;

recovering said second precedent snapshot difference list $S_{32}$ from said second precedent backup $B_{32}$; and restoring said second state snapshot $S_2$ by overwriting at least a portion of said third state snapshot $S_3$ with the contents of said second precedent backup $B_{32}$.

4. A method of protecting computer data, said method comprising the steps of:

acquiring a first state snapshot $S_1$ of a first data volume consistent state at a time $t_1$;

acquiring a second state snapshot $S_2$ of a second data volume consistent state at a time $t_2>t_1$;

generating a first precedent snapshot difference list $S_{21}$ comprising an identification of data blocks of said first state snapshot $S_1$ differing from data blocks in said second state snapshot $S_2$;

creating a first precedent backup $B_{21}$ by copying from said first state snapshot $S_1$ data blocks identified in said first precedent snapshot difference list $S_{21}$, said first precedent backup $B_{21}$ further comprising said first precedent snapshot difference list $S_{21}$;

acquiring a third state snapshot $S_3$ of a third data volume consistent state at a time $t_3>t_2$;

generating a second precedent snapshot difference list $S_{32}$ comprising an identification of data blocks of said second state snapshot $S_2$ differing from data blocks in said third state snapshot $S_3$;

creating a second precedent backup $B_{32}$ by copying from said second state snapshot $S_2$ data blocks identified in said second precedent snapshot difference list $S_{32}$, said second precedent backup $B_{32}$ further comprising said second precedent snapshot difference list $S_{32}$;

generating a concatenated precedent snapshot difference list $S_{31}$ comprising an identification of said data blocks of said second state snapshot $S_2$ differing from data blocks in said third state snapshot $S_3$ and an identification of said data blocks of said first state snapshot $S_1$ differing from data blocks in said second state snapshot $S_2$;

creating a concatenated backup $B_{31}$ by copying all said blocks in said first precedent backup $B_{21}$ and copying all blocks in said second precedent backup $B_{32}$ not present in said first precedent backup $B_{21}$;

copying said first precedent snapshot difference list $S_{21}$ and said second precedent snapshot difference list $S_{32}$ into said concatenated backup $B_{31}$; and storing said concatenated backup $B_{31}$ in an offline memory means.

5. The method of claim 4 further comprising the steps of:

retrieving said concatenated backup $B_{31}$;

recovering said concatenated precedent snapshot difference list $S_{31}$ from said concatenated backup $B_{31}$; and restoring said first state snapshot $S_1$ by overwriting at least a portion of said third state snapshot $S_3$ with the contents of said concatenated backup $B_{31}$.

6. The method of claim 4 further comprising the steps of:

acquiring a fourth state snapshot $S_4$ of a fourth data volume consistent state at a time $t_4>t_3$;

generating a third precedent snapshot difference list $S_{43}$ comprising an identification of data blocks of said third state snapshot $S_3$ differing from data blocks in said fourth state snapshot $S_4$;

creating a third precedent backup $B_{43}$ by copying from said third state snapshot $S_3$ data blocks identified in said third precedent snapshot difference list $S_{43}$, said third precedent backup $B_{43}$ further comprising said third precedent snapshot difference list $S_{43}$;

generating a concatenated precedent snapshot difference list $S_{42}$ comprising an identification of said data blocks of said third state snapshot $S_3$ differing from data blocks in said fourth state snapshot $S_4$ and an identification of said data blocks of said second state snapshot $S_2$ differing from data blocks in said third state snapshot $S_3$;

creating a concatenated backup $B_{42}$ by copying all said blocks in said second precedent backup $B_{32}$ and copying all blocks in said third precedent backup $B_{43}$ not present in said second precedent backup $B_{32}$, and copying said second and third precedent difference lists $S_{32}$ and $S_{43}$ into said concatenated backup $B_{42}$; and creating a concatenated backup $B_{41}$ by copying all said blocks in said first precedent backup $B_{21}$ and copying all blocks in said concatenated backup $B_{42}$ not present in said first precedent backup $B_{21}$, and copying first, second, and third precedent difference lists $S_{21}$, $S_{32}$, and $S_{43}$, into said concatenated backup $B_{41}$.

7. The method of claim 6 further comprising the steps of:

retrieving said concatenated backup $B_{41}$;

recovering said concatenated precedent snapshot difference list $S_{41}$ from said concatenated backup $B_{41}$; and restoring said first state snapshot $S_1$ by overwriting at least a portion of said fourth state snapshot $S_4$ with the contents of said concatenated backup $B_{41}$.

8. A method of protecting computer data, said method comprising the steps of:

acquiring a base state snapshot $S_0$ of a data volume base state at a time $t_0$;

acquiring a first state snapshot $S_1$ of a first data volume consistent state at a time $t_1>t_0$;

acquiring a second state snapshot $S_2$ of a second data volume consistent state at a time $t_2>t_1$;

generating a first succedent snapshot difference list $S_{01}$ comprising an identification of data blocks of said first state snapshot $S_1$ differing from data blocks in said base state snapshot $S_0$;

generating a first precedent snapshot difference list $S_{21}$ comprising an identification of data blocks of said first state snapshot $S_1$ differing from data blocks in said second state snapshot $S_2$;

creating a first composite backup $C_{012}$ by copying from said first state snapshot $S_1$ data blocks identified in first succedent snapshot difference list $S_{01}$ and copying from said first state snapshot $S_1$ data blocks identified in said first precedent snapshot difference list $S_{21}$;

copying said first succedent snapshot difference list $S_{01}$ and said first precedent snapshot difference list $S_{21}$ into said first composite backup $C_{012}$;

retrieving said first composite backup $C_{012}$;

recovering said first precedent snapshot difference list $S_{21}$; and restoring said first state snapshot $S_1$ by overwriting at least a portion of said second state snapshot $S_2$ with at least a portion of the contents of said first composite backup $C_{012}$.

9. A method of protecting computer data, said method comprising the steps of:

acquiring a base state snapshot $S_0$ of a data volume base state at a time $t_0$;

acquiring a first state snapshot $S_1$ of a first data volume consistent state at a time $t_1 > t_0$;

acquiring a second state snapshot $S_2$ of a second data volume consistent state at a time $t_2 > t_1$;

generating a first succedent snapshot difference list $S_{01}$ comprising an identification of data blocks of said first state snapshot $S_1$ differing from data blocks in said base state snapshot $S_0$;

generating a first precedent snapshot difference list $S_{21}$ comprising an identification of data blocks of said first state snapshot $S_1$ differing from data blocks in said second state snapshot $S_2$;

creating a first composite backup $C_{012}$ by copying from said first state snapshot $S_1$ data blocks identified in first succedent snapshot difference list $S_{01}$ and copying from said first state snapshot $S_1$ data blocks identified in said first precedent snapshot difference list $S_{21}$;

copying said first succedent snapshot difference list $S_{01}$ and said first precedent snapshot difference list $S_{21}$ into said first composite backup $C_{012}$;

acquiring a plurality of third through $n^{th}$ state snapshots $S_3$ through $S_n$ of third through $n^{th}$ data volume consistent states at respective times $t_3 < \ldots t_j \ldots \leq t_n$;

generating second through $(n-1)^{th}$ succedent snapshot difference lists $S_{12}$ through $S_{(n-2)(n-1)}$ respectively, a $(j-1)^{th}$ succedent snapshot difference list $S_{(j-2)(j-1)}$ comprising an identification of data blocks of a $(j-1)^{th}$ state snapshot $S_{(j-1)}$ differing from data blocks in a $(j-2)^{th}$ state snapshot $S_{(j-2)}$;

generating second through $(n-1)^{th}$ precedent snapshot difference lists $S_{32}$ through $S_{(n)(n-1)}$ respectively, a $(j-1)^{th}$ precedent snapshot difference list $S_{(j)(j-1)}$ comprising an identification of data blocks of a $(j-1)^{th}$ state snapshot $S_{(j-1)}$ differing from data blocks in a $j^{th}$ state snapshot $S_j$;

creating second through $(n-1)^{th}$ composite backups $C_{123}$ through $C_{(n-2)(n-1)(n)}$, wherein a $(j-1)^{th}$ composite backup $C_{(j-2)(j-1)(j)}$ is created by copying from said $(j-1)^{th}$ state snapshot $S_{(j-1)}$ data blocks identified in said $(j-1)^{th}$ succedent snapshot difference list $S_{(j-2)(j-1)}$ and copying from said $(j-1)^{th}$ state snapshot $S_{(j-1)}$ data blocks identified in said $(j-1)^{th}$ precedent snapshot difference list $S_{(j)(j-1)}$; and copying said succedent snapshot difference lists $S_{12}$ through $S_{(n-2)(n-1)}$ and said precedent snapshot difference lists $S_{32}$ through $S_{(n)(n-1)}$ into said respective composite backups $C_{123}$ through $C_{(n-2)(n-1)(n)}$;

assigning a unique identifier to each said state snapshot $S_j$;

for each said composite backup $C_{(j-2)(j-1)(j)}$, identifying said state snapshots $S_{(j-2)}$ and $S_j$ as difference snapshots and said $(j-1)^{th}$ state snapshot $S_{(j-1)}$ as a content snapshot:

for each said composite backup $C_{(j-2)(j-1)(j)}$, copying the unique identifiers of said state snapshots $S_{(j-2)}$, $S_{(j-1)}$, and $S_j$ into said $(j-1)^{th}$ composite backup $C_{(j-2)(j-1)(j)}$;

retrieving said $(j-1)^{th}$ composite backup $C_{(j-2)(j-1)(j)}$;

recovering said $(j-1)^{th}$ precedent snapshot difference list $S_{(j)(j-1)}$ from said $(j-1)^{th}$ composite backup $C_{(j-2)(j-1)(j)}$; and restoring said $(j-1)^{th}$ state snapshot $S_{j-1}$ by overwriting at least a portion of said $j^{th}$ state snapshot $S_j$ with the contents of said $(j-1)^{th}$ composite backup $C_{(j-2)(j-1)(j)}$.

10. A method of protecting computer data, said method comprising the steps of:

acquiring a base state snapshot $S_0$ of a data volume base state at a time $t_0$;

acquiring a first state snapshot $S_1$ of a first data volume consistent state at a time $t_1 > t_0$;

acquiring a second state snapshot $S_2$ of a second data volume consistent state at a time $t_2 > t_1$;

generating a first succedent snapshot difference list $S_{01}$ comprising an identification of data blocks of said first state snapshot $S_1$ differing from data blocks in said base state snapshot $S_0$;

generating a first precedent snapshot difference list $S_{21}$ comprising an identification of data blocks of said first state snapshot $S_1$ differing from data blocks in said second state snapshot $S_2$;

creating a first composite backup $C_{012}$ by copying from said first state snapshot $S_1$ data blocks identified in first succedent snapshot difference list $S_{01}$ and copying from said first state snapshot $S_1$ data blocks identified in said first precedent snapshot difference list $S_{21}$;

copying said first succedent snapshot difference list $S_{01}$ and said first precedent snapshot difference list $S_{21}$ into said first composite backup $C_{012}$;

acquiring a plurality of third through $n^{th}$ state snapshots $S_3$ through $S_n$ of third through $n^{th}$ data volume consistent states at respective times $t_3 < \ldots t_j \ldots < t_n$;

generating second through $(n-1)^{th}$ succedent snapshot difference lists $S_{12}$ through $S_{(n-2)(n-1)}$ respectively, a $(j-1)^{th}$ succedent snapshot difference list $S_{(j-2)(j-1)}$ comprising an identification of data blocks of a $(j-1)^{th}$ state snapshot $S_{(j-1)}$ differing from data blocks in a $(j-2)^{th}$ state snapshot $S_{(j-2)}$;

generating second through $(n-1)^{th}$ precedent snapshot difference lists $S_{32}$ through $S_{(n)(n-1)}$ respectively, a $(j-1)^{th}$ precedent snapshot difference list $S_{(j)(j-1)}$ comprising an identification of data blocks of a $(j-1)^{th}$ state snapshot $S_{(j-1)}$ differing from data blocks in a $j^{th}$ state snapshot $S_j$;

creating second through $(n-1)^{th}$ composite backups $C_{123}$ through $C_{(n-2)(n-1)(n)}$, wherein a $(j-1)^{th}$ composite backup $C_{(j-2)(j-1)(j)}$ is created by copying from said $(j-1)^{th}$ state snapshot $S_{(j-1)}$ data blocks identified in said $(j-1)^{th}$ succedent snapshot difference list $S_{(j-2)(j-1)}$ and copying from said $(j-1)^{th}$ state snapshot $S_{(j-1)}$ data blocks identified in said $(j-1)^{th}$ precedent snapshot difference list $S_{(j)(j-1)}$; and copying said succedent snapshot difference lists $S_{12}$ through $S_{(n-2)(n-1)}$ and said precedent snapshot difference lists $S_{32}$ through $S_{(n)(n-1)}$ into said respective composite backups $C_{123}$ through $C_{(n-2)(n-1)(n)}$;

assigning a unique identifier to each said state snapshot $S_j$;

for each said composite backup $C_{(j-2)(j-1)(j)}$, identifying said state snapshots $S_{(j-1)}$ and $S_j$ as difference snapshots and said $(j-1)^{th}$ state snapshot $S_{(j-1)}$ as a content snapshot;

for each said composite backup $C_{(j-2)(j-1)(j)}$, copying the unique identifiers of said state snapshots $S_{(j-2)}$, $S_{(j-1)}$, and $S_j$ into said $(j-1)^{th}$ composite backup $C_{(j-2)(j-1)(j)}$; and assigning the unique identifier of the content snapshot of said $(j-1)^{th}$ composite backup $C_{(j-2)(j-1)(j)}$ to be the unique identifier of said restored $(j-1)^{th}$ state snapshot $S_{(j-1)}$.

11. A method of protecting computer data, said method comprising the steps of:

acquiring a base state snapshot $S_0$ of a data volume base state at a time $t_0$;

acquiring a first state snapshot $S_1$ of a first data volume consistent state at a time $t_1 > t_0$;

acquiring a second state snapshot $S_2$ of a second data volume consistent state at a time $t_2 > t_1$;

generating a first succedent snapshot difference list $S_{01}$ comprising an identification of data blocks of said first state snapshot $S_1$ differing from data blocks in said base state snapshot $S_0$;

generating a first precedent snapshot difference list $S_{21}$ comprising an identification of data blocks of said first state snapshot $S_1$ differing from data blocks in said second state snapshot $S_2$;

creating a first composite backup $C_{012}$ by copying from said first state snapshot $S_1$ data blocks identified in first succedent snapshot difference list $S_{01}$ and copying from said first state snapshot $S_1$ data blocks identified in said first precedent snapshot difference list $S_{21}$;

copying said first succedent snapshot difference list $S_{01}$ and said first precedent snapshot difference list $S_{21}$ into said first composite backup $C_{012}$;

acquiring a plurality of third through $n^{th}$ state snapshots $S_3$ through $S_n$ of third through $n^{th}$ data volume consistent states at respective times $t_3 < \ldots t_j \ldots \leq t_n$;

generating second through $(n-1)^{th}$ succedent snapshot difference lists $S_{12}$ through $S_{(n-2)(n-1)}$ respectively, a $(j-1)^{th}$ succedent snapshot difference list $S_{(j-2)(j-1)}$ comprising an identification of data blocks of a $(j-1)^{th}$ state snapshot $S_{(j-1)}$ differing from data blocks in a $(j-2)^{th}$ state snapshot $S_{(j-2)}$;

generating second through $(n-1)^{th}$ precedent snapshot difference lists $S_{32}$ through $S_{(n)(n-1)}$ respectively, a $(j-1)^{th}$ precedent snapshot difference list $S_{(j)(j-1)}$ comprising an identification of data blocks of a $(j-1)^{th}$ state snapshot $S_{(j-1)}$ differing from data blocks in a $j^{th}$ state snapshot $S_j$;

creating second through $(n-1)^{th}$ composite backups $C_{123}$ through $C_{(n-2)(n-1)(n)}$, wherein a $(j-1)^{th}$ composite backup $C_{(j-2)(j-1)(j)}$ is created by copying from said $(j-1)^{th}$ state snapshot $S_{(j-1)}$ data blocks identified in said $(j-1)^{th}$ succedent snapshot difference list $S_{(j-2)(j-1)}$ and copying from said $(j-1)^{th}$ state snapshot $S_{(j-1)}$ data blocks identified in said $(j-1)^{th}$ precedent snapshot difference list $S_{(j)(j-1)}$;

copying said succedent snapshot difference lists $S_{12}$ through $S_{(n-2)(n-1)}$ and said precedent snapshot difference lists $S_{32}$ through $S_{(n)(n-1)}$ into said respective composite backups $C_{123}$ through $C_{(n-2)(n-1)(n)}$;

creating a $(j-1)^{th}$ precedent backup $B_{(j)(j-1)}$ by copying from said $(j-1)^{th}$ state snapshot $S_{(j-1)}$ data blocks identified in said $(j-1)^{th}$ precedent snapshot difference list $S_{(j)(j-1)}$, said $(j-1)^{th}$ precedent backup $B_{(j)(j-1)}$ further comprising said $(j-1)^{th}$ precedent snapshot difference list $S_{(j)(j-1)}$;

creating a $(j-2)^{th}$ precedent backup $B_{(j-1)(j-2)}$ by copying from said $(j-2)^{th}$ state snapshot $S_{(j-2)}$ data blocks identified in said $(j-2)^{th}$ precedent snapshot difference list $S_{(j-1)(j-2)}$, said $(j-2)^{th}$ precedent backup $B_{(j-1)(j-2)}$ further comprising said $(j-2)^{th}$ precedent snapshot difference list $S_{(j-1)(j-2)}$; and creating a first concatenated precedent backup $B_{(j)(j-2)}$ from said $(j-1)^{th}$ precedent backup $B_{(j)(j-1)}$ and said $(j-2)^{th}$ precedent backup $B_{j-1)(j-2)}$ by copying all blocks in said $(j-2)^{th}$ precedent backup $B_{(j-1)(j-2)}$ and by also copying all blocks in said $(j-1)^{th}$ precedent backup $B_{(j)(j-1)}$ not present in said $(j-2)^{th}$ precedent backup $B_{(j-1)(j-2)}$ and by copying said precedent difference lists $S_{(j-1)(j-2)}$ and $S_{(j)(j-1)}$ from said precedent backups $B_{(j-1)(j-2)}$ and $B_{(j)(j-1)}$ into said concatenated precedent backup $B_{(j)(j-2)}$.

12. The method of claim 11 further comprising the steps of:

creating a $(j-3)^{th}$ precedent backup $B_{(j-2)(j-3)}$ by copying from said $(j-3)^{th}$ state snapshot $S_{(j-3)}$ data blocks identified in said $(j-3)^{th}$ precedent snapshot difference list $S_{(j-2)(j-3)}$, said $(j-3)^{th}$ precedent backup $B_{(j-2)(j-3)}$ further comprising said $(j-3)^{th}$ precedent snapshot difference list $S_{(j-2)(j-3)}$; and creating a second concatenated precedent backup $B_{(j)(j-3)}$ from said first concatenated precedent backup $B_{(j)(j-2)}$ and said $(j-3)^{th}$ precedent backup $B_{(j-2)(j-3)}$ by copying all blocks in said $(j-3)^{th}$ precedent backup $B_{(j-2)(j-3)}$ and by also copying all blocks in said first concatenated precedent backup $B_{(j)(j-2)}$ not present in said $(j-3)^{th}$ precedent backup $B_{(j-2)(j-3)}$, and by copying said precedent difference lists $S_{(j-2)(j-3)}$, $S_{(j-1)(j-2)}$, and $S_{(j)(j-1)}$ from said precedent backup $B_{(j-2)(j-3)}$ and said concatenated precedent backup $B_{(j)(j-2)}$ into said concatenated precedent backup $B_{(j)(j-3)}$.

13. The method of claim 12 further comprising the steps of:

retrieving a concatenated precedent backup $B_{(h)(g)}$, where $g < h \leq n$; and restoring a $g^{th}$ state snapshot $S_g$ by overwriting an $h^{th}$ state snapshot $S_h$ with said concatenated precedent backup $B_{(h)(g)}$.

14. A method of protecting computer data, said method comprising the steps of:

acquiring a base state snapshot $S_0$ of a data volume base state at a time $t_0$;

acquiring a first state snapshot $S_1$ of a first data volume consistent state at a time $t_1 > t_0$;

acquiring a second state snapshot $S_2$ of a second data volume consistent state at a time $t_2 > t_1$;

generating a first succedent snapshot difference list $S_{01}$ comprising an identification of data blocks of said first state snapshot $S_1$ differing from data blocks in said base state snapshot $S_0$;

generating a first precedent snapshot difference list $S_{21}$ comprising an identification of data blocks of said first state snapshot $S_1$ differing from data blocks in said second state snapshot $S_2$;

creating a first composite backup $C_{012}$ by copying from said first state snapshot $S_1$ data blocks identified in first succedent snapshot difference list $S_{01}$ and copying from said first state snapshot $S_1$ data blocks identified in said first precedent snapshot difference list $S_{21}$;

copying said first succedent snapshot difference list $S_{01}$ and said first precedent snapshot difference list $S_{21}$ into said first composite backup $C_{012}$;

acquiring a plurality of third through $n^{th}$ state snapshots $S_3$ through $S_n$ of third through $n^{th}$ data volume consistent states at respective times $t_3 < \ldots t_j \ldots \leq t_n$;

generating second through $(n-1)^{th}$ succedent snapshot difference lists $S_{12}$ though $S_{(n-2)(n-1)}$ respectively, a $(j-1)^{th}$ succedent snapshot difference list $S_{(j-2)(j-1)}$ comprising an identification of data blocks of a $(j-1)^{th}$ state snapshot $S_{(j-1)}$ differing from data blocks in a $(j-2)^{th}$ state snapshot $S_{(j-2)}$;

generating second through $(n-1)^{th}$ precedent snapshot difference lists $S_{32}$ through $S_{(n)(n-1)}$ respectively, a $(j-1)^{th}$ precedent snapshot difference list $S_{(j)(j-1)}$ comprising an identification of data blocks of a $(j-1)^{th}$ state snapshot $S_{(j-1)}$ differing from data blocks in a $j^{th}$ state snapshot $S_j$;

creating second through $((n-1)^{th}$ composite backups $C_{123}$ through $C_{(n-2)(n-1)(n)}$, wherein a $(j-1)^{th}$ composite backup $C_{(j-2)(j-1)(j)}$ is created by copying from said $(j-1)^{th}$ state snapshot $S_{(j-1)}$ data blocks identified in said $(j-1)^{th}$ succedent snapshot difference list $S_{(j-2)(j-1)}$ and copying from said $(j-1)^{th}$ state snapshot $S_{(j-1)}$ data blocks identified in said $(j-1)^{th}$ precedent snapshot difference list $S_{(j)(j-1)}$; and copying said succedent snapshot difference lists $S_{12}$ through $S_{(n-2)(n-1)}$ and said precedent snapshot difference lists $S_{32}$ though $S_{(n)(n-1)}$ into said respective composite backups $C_{123}$ through $C_{(n-2)(n-1)(n)}$;

creating a $(j-1)^{th}$ succedent backup $B_{(j-2)(j-1)}$ by copying from said $(j-1)^{th}$ state snapshot $S_{(j-1)}$ data blocks identified in said $(j-1)^{th}$ succedent snapshot difference list $S_{(j-2)(j-1)}$, said $(j-1)^{th}$ succedent backup $B_{(j-2)(j-1)}$ further comprising said $(j-1)^{th}$ succedent snapshot difference list $S_{(j-2)(j-1)}$;

creating a $j^{th}$ succedent backup $B_{(j-1)(j)}$ by copying from said $j^{th}$ state snapshot $S_j$ data blocks identified in said $j^{th}$ succedent snapshot difference list $S_{(j-1)(j)}$, said $j^{th}$ succedent backup $j^{th}$ further comprising said $j^{th}$ succedent snapshot difference list $S_{(j-1)(j)}$; and creating a first concatenated succedent backup $B_{(j-2)(j)}$ from said $j^{th}$ succedent backup $B_{(j-1)(j)}$ and said $(j-1)^{th}$ succedent backup $B_{(j-2)(j-1)}$ by copying all blocks in said $j^{th}$ succedent backup $B_{(j-1)(j)}$ and by also copying all blocks in said $(j-1)^{th}$ succedent backup $B_{(j-2)(j-1)}$ not present in said $j^{th}$ succedent backup $B_{(j-1)(j)}$, and by copying said difference lists $S_{(j-1)(j)}$ and $S_{(j-2)(j-1)}$.

15. The method of claim 14 further comprising the steps of:

creating a $(j-2)^{th}$ succedent backup $B_{(j-3)(j-2)}$ by copying from said $(j-2)^{th}$ state snapshot $S_{(j-2)}$ data blocks identified in said $(j-2)^{th}$ succedent snapshot difference list $S_{(j-3)(j-2)}$, said $(j-2)^{th}$ succedent backup $B_{(j-3)(j-2)}$ further comprising said $(j-2)^{th}$ succedent snapshot difference list $S_{(j-3)(j-2)}$; and creating a second concatenated succedent backup $B_{(j-3)(j)}$ from said first concatenated succedent backup $B_{(j-2)(j)}$ and said $(j-2)^{th}$ succedent backup $B_{(j-3)(j-2)}$ by copying all blocks in said first concatenated succedent backup $B_{(j-2)(j)}$ and by also copying all blocks in said $(j-2)^{th}$ succedent backup $B_{(j-3)(j-2)}$ not present in said first concatenated succedent backup $B_{(j-2)(j)}$, and copying said difference lists $S_{(j-1)(j)}$, $S_{(j-2)(j-1)}$, and $S_{(j-3)(j-2)}$ from said first concatenated succedent backup $B_{(j-2)(j)}$ and said $(j-2)^{th}$ succedent backup $B_{(j-3)(j-2)}$.

16. An apparatus suitable for protecting the data volume in a computer system, said apparatus comprising:

means for acquiring a sequence of state snapshots $S_0, \ldots, S_j, \ldots, S_n$ of the data volume, each said state snapshot acquired at a respective time $t_0 < \ldots t_j \ldots < t_n$;

means for generating a $(j-1)^{th}$ precedent snapshot difference list $S_{(j)(j-1)}$ comprising a list of one or more data blocks of said $j^{th}$ state snapshot $S_j$ identified as differing from data blocks of said $(j-1)^{th}$ state snapshot $S_{(j-1)}$;

means for copying from said $(j-1)^{th}$ state snapshot $S_{j-1}$ all the data blocks listed in said $(j-1)^{th}$ precedent snapshot difference list $S_{(j)(j-1)}$ into a $(j-1)^{th}$ precedent backup $B_{(j)(j-1)}$;

means for copying said precedent snapshot difference list $S_{(j)(j-1)}$;

means for storing said $(j-1)^{th}$ precedent backup $B_{(j)(j-1)}$ in an offline memory means;

means for retrieving said $(j-1)^{th}$ precedent backup $B_{(j)(j-1)}$;

means for recovering said $(j-1)^{th}$ precedent snapshot difference list $S_{(j)(j-1)}$ from said $(j-1)^{th}$ precedent backup $B_{(j)(j-1)}$; and means for overwriting at least a portion of said $j^{th}$ state snapshot $S_j$ with at least a portion of the contents of said $(j-1)^{th}$ precedent backup $B_{(j)(j-1)}$.

17. The apparatus of claim 16 further comprising:

means for generating a $(j-1)^{th}$ succedent snapshot difference list $S_{(j-2)(j-1)}$ comprising a list of one or more data blocks of said $(j-1)^{th}$ state snapshot $S_{(j-1)}$ identified as differing from data blocks of said $(j-2)^{th}$ state snapshot $S_{(j-2)}$; and means for copying from said $(j-1)^{th}$ state snapshot $S_{(j-1)}$ all the data blocks listed in said $(j-1)^{th}$ succedent snapshot difference list $S_{(j-2)(j-1)}$ into said $(j-1)^{th}$ precedent backup $B_{(j)(j-1)}$; and means for copying said $(j-1)^{th}$ succedent snapshot difference list $S_{(j-2)(j-1)}$.

18. The apparatus of claim 17 further comprising:

means for recovering said $(j-1)^{th}$ succedent snapshot difference list $S_{(j-2)(j-1)}$ from said $(j-1)^{th}$ precedent backup $B_{(j)(j-1)}$; and means for overwriting at least a portion of said $(j-2)^{th}$ state snapshot $S_{(j-2)}$ with at least a portion of the contents of said $(j-1)^{th}$ precedent backup $B_{(j)(j-1)}$.

19. The apparatus of claim 18 further comprising:

means for concatenating a $(g+1)^{th}$ succedent backup $B_{(g)(g+1)}$ with a $(g+2)^{th}$ succedent backup $B_{(g+1)(g+2)}$ through an $h^{th}$ succedent backup $B_{(h-1)(h)}$, where g<h, into a concatenated succedent backup $B_{(g)(h)}$; and means for storing said concatenated succedent backup $B_{(g)(h)}$ in an offline memory means.

* * * * *